(12) United States Patent
Kihara et al.

(10) Patent No.: US 11,414,546 B2
(45) Date of Patent: Aug. 16, 2022

(54) RESIN COMPOSITION AND ELECTRIC INSULATING SHEET

(71) Applicant: Nitto Shinko Corporation, Sakai (JP)

(72) Inventors: Yasuyuki Kihara, Sakai (JP); Takahiro Sakaguchi, Sakai (JP); Jun Fujiki, Sakai (JP)

(73) Assignee: NITTO SHINKO CORPORATION, Sakai (JP)

( * ) Notice: Subject to any disclaimer, the term of this patent is extended or adjusted under 35 U.S.C. 154(b) by 221 days.

(21) Appl. No.: 16/515,921

(22) Filed: Jul. 18, 2019

(65) Prior Publication Data

US 2019/0338125 A1  Nov. 7, 2019

Related U.S. Application Data

(62) Division of application No. 15/569,321, filed as application No. PCT/JP2016/084660 on Nov. 22, 2016, now abandoned.

(30) Foreign Application Priority Data

Nov. 24, 2015 (JP) .................................. 2015-228793

(51) Int. Cl.
*C08L 81/06* (2006.01)
*C08L 71/00* (2006.01)
(Continued)

(52) U.S. Cl.
CPC .............. *C08L 81/06* (2013.01); *B32B 5/022* (2013.01); *B32B 27/12* (2013.01); *B32B 27/286* (2013.01);
(Continued)

(58) Field of Classification Search
CPC ....... B32B 27/286; B32B 27/34; B32B 27/38; B32B 27/12; B32B 27/285;
(Continued)

(56) References Cited

U.S. PATENT DOCUMENTS 4,983,247 A * 1/1991 Kim ................... B29C 33/02
156/272.2
2005/0272853 A1   12/2005 El-Hibri
(Continued)

FOREIGN PATENT DOCUMENTS

EP    2 701 162 A1   2/2014
JP     52-53973 A    4/1977
(Continued)

OTHER PUBLICATIONS

Ullmann, Fritz. (2005). Ullmann's Chemical Engineering and Plant Design, vols. 1-2—6.1.4 Viscosity of Liquid Mixtures. John Wiley & Sons. Retrieved from https://app.knovel.com/hotlink/pdf/id:kt007EFS31/ullmanns-chemical-engineering/viscosity-liquid-mixtures (Year: 2005).*

(Continued)

*Primary Examiner* — Larissa Rowe Emrich
(74) *Attorney, Agent, or Firm* — WHDA, LLP

(57) ABSTRACT

An object of the present invention is to provide a resin composition having excellent heat resistance and excellent thermal adhesiveness, so as to provide an electric insulating sheet having excellent heat resistance. In order to achieve the aforementioned object, the present invention provides a resin composition which contains a polyether sulfone resin and a resin having a specific melt viscosity, and contains at least a phenoxy resin other than the polyether sulfone resin.

8 Claims, 2 Drawing Sheets

(51) Int. Cl.
  *B32B 27/28* (2006.01)
  *B32B 5/02* (2006.01)
  *B32B 27/12* (2006.01)
  *B32B 27/34* (2006.01)
  *B32B 27/36* (2006.01)

(52) U.S. Cl.
  CPC ............... *B32B 27/34* (2013.01); *B32B 27/36* (2013.01); *C08L 71/00* (2013.01); *B32B 2250/03* (2013.01); *B32B 2250/40* (2013.01); *B32B 2262/0276* (2013.01); *B32B 2270/00* (2013.01); *B32B 2307/206* (2013.01); *C08G 2650/56* (2013.01); *C08L 2201/08* (2013.01); *C08L 2203/20* (2013.01); *C08L 2205/03* (2013.01)

(58) Field of Classification Search
  CPC ....... B32B 2262/0276; B32B 2307/206; C08L 81/06; C08L 79/08; C08L 2201/08; C08L 2203/20; C08L 2205/03; C08L 71/12; C08L 77/00; C08G 2650/56
  See application file for complete search history.

(56) References Cited

U.S. PATENT DOCUMENTS

| | | | | |
|---|---|---|---|---|
| 2012/0103661 | A1* | 5/2012 | Narusawa | D06M 15/59 174/137 R |
| 2013/0085224 | A1* | 4/2013 | Weber | C08L 81/06 524/539 |
| 2014/0048309 | A1* | 2/2014 | Kihara | H02K 3/30 174/209 |
| 2018/0079879 | A1* | 3/2018 | Otsuki | B29C 43/52 |

FOREIGN PATENT DOCUMENTS

| | | | |
|---|---|---|---|
| JP | 61-168668 | A | 7/1986 |
| JP | 6-9386 | A | 1/1993 |
| JP | 2005-536597 | A | 12/2005 |
| JP | 2006-077193 | A | 3/2006 |
| JP | 2006-137801 | A | 6/2006 |
| JP | 2008-88277 | A | 4/2008 |
| JP | 2012-254591 | A | 12/2012 |
| JP | 2014-40528 | A | 3/2014 |
| JP | 2014-80527 | A | 5/2014 |
| JP | 2015-143343 | A | 8/2015 |
| RU | 2011 129182 | A | 1/2013 |
| WO | 2012/108403 | A1 | 8/2012 |
| WO | WO-2016152856 | A1 * | 9/2016 ............ B29C 43/02 |

OTHER PUBLICATIONS

BASF. Ultrason E, S, P Product Brochure. Ultrason E, S, P Product Brochure, BASF.*
"Zytel Nylon Resin." DuPont Product Datasheets, DuPont, dupont.materialdatacenter.com/profiler/G7BZ7/standard/main/ds/42137/4097.*
Crow. "Polymer Properties Database." Polymer Properties Database, CROW, polymerdatabase.com/polymer%20classes/Phenoxy%20type.html.*
International Search Report dated Jan. 31, 2017, issued in counterpart International Application No. PCT/JP2016/084660 (2 pages).
Notification of Transmittal of Translation of the International Preliminary Report on Patentabililty (Form PCT/IB/326) issued in counterpart International Application No. PCT/JP2016/084660 dated Jun. 7, 2018 with Forms PCT/IB/373, PCT/IB/338, and PCT/ISA/237 (11 pages).
Extended Search Report dated Jun. 19, 2019, issued in counterpart EP Application No. 16868572.5 (7 pages).

* cited by examiner

RESIN COMPOSITION AND ELECTRIC INSULATING SHEET

CROSS-REFERENCE TO RELATED APPLICATION

This application is a Divisional of U.S. application Ser. No. 15/569,321, filed on Oct. 25, 2017, which is a national stage application filed under 35 USC 371 of International Application No. PCT/JP2016/084660, filed Nov. 22, 2016, and which is based upon and claims priority to Japanese Patent Application No. 2015-228793 filed on Nov. 24, 2015, the disclosure of which is incorporated herein by reference in its entirety.

FIELD

The present invention relates to a resin composition and an electric insulating sheet.

BACKGROUND

Conventionally, attempts to produce a laminated sheet by laminating a specific resin film onto a polyester fiber non-woven fabric so as to produce a sheet having a different function from the function of the polyester fiber non-woven fabric alone have been made (see Patent Literature 1 below).

CITATION LIST

Patent Literature

Patent Literature 1: JP 2012-254591 A

SUMMARY

Technical Problem

Polyester resins have comparatively high heat resistance among general resins. Therefore, polyester fiber non-woven fabrics are widely used in applications that require heat resistance. In the case of forming a laminated sheet by bonding sheets having excellent heat resistance to each other, if the sheets are bonded by an adhesive having low heat resistance such as a pressure-sensitive adhesive, the laminated sheet may possibly have low heat resistance. Therefore, in the case of forming a laminated sheet using a polyester fiber non-woven fabric and a resin film, it is required to directly adhere the polyester fiber non-woven fabric and the resin film to each other by thermal adhesion without using such a pressure-sensitive adhesive or the like.

As a stator in a large motor, components such as electric insulating sheets are required to have heat resistance. Therefore, a laminated sheet obtained by bonding sheets having excellent heat resistance such as aramid paper and a polyethylene naphthalate film to each other with an epoxy adhesive is used for such an electric insulating sheet of this type. If there is a resin composition that has good thermal adhesiveness to fiber materials such as aramid paper, the thickness of such an electric insulating sheet of this type can be reduced.

However, a resin composition having excellent heat resistance and excellent thermal adhesiveness to fiber materials such as a polyester fiber non-woven fabric and aramid paper has not been found. It is therefore an object of the present invention to provide a resin composition having excellent heat resistance and excellent thermal adhesiveness, so as to provide an electric insulating sheet having excellent heat resistance.

Solution to Problem

In order to solve the aforementioned problem, the present invention provide a resin composition containing: a polyether sulfone resin as a main component of its resin components; and one or two or more types of resins other than the polyether sulfone resin as accessory components thereof, wherein the accessory components include at least a phenoxy resin, and when the accessory components have a melt viscosity at 300° C. of $\eta_0$ (Pa·s), and the polyether sulfone resin has a melt viscosity at 300° C. of $\eta_1$ (Pa·s), the resin composition satisfies Relational expression (1) below:

$$\eta_0 \geq (\eta_1 \cdot 100) \tag{1}$$

Further, in order to solve the aforementioned problem, the present invention provides an electric insulating sheet including: a polyester fiber non-woven fabric; and a resin film laminated onto the polyester fiber non-woven fabric, wherein the polyester fiber non-woven fabric and the resin film are thermally adhered to each other, the resin film has at least a surface that is thermally adhered to the polyester fiber non-woven fabric and is formed by a resin composition containing a polyether sulfone resin, the resin composition contains the polyether sulfone resin as a main component of its resin components and one or two or more types of resins other than the polyether sulfone resin as accessory components thereof, the accessory components include at least a phenoxy resin, and when the accessory components have a melt viscosity at 300° C. of $\eta_0$ (Pa·s), and the polyether sulfone resin has a melt viscosity at 300° C. of $\eta n_1$ (Pa·s), the resin composition satisfies Relational expression (1) below:

$$\eta_0 \geq (\eta_1 \cdot 100) \tag{1}$$

DESCRIPTION OF EMBODIMENTS

Figure 1:
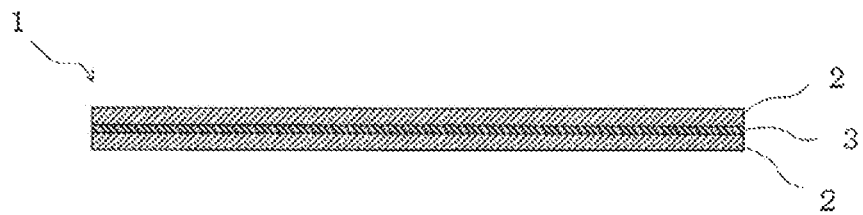
FIG. 1 is a schematic sectional view showing an electric insulating sheet of an embodiment.

Hereinafter, preferable embodiments of a resin composition and an electric insulating sheet of the present invention will be described with reference to drawings. First, the electric insulating sheet will be described. As shown FIG. 1, an electric insulating sheet 1 of this embodiment has a three-layer structure. In the electric insulating sheet 1 of this embodiment, two pieces of polyester fiber non-woven fabrics 2 are laminated via a resin film 3. The resin film 3 is formed by the resin composition of the present invention. In this embodiment, in order to allow the electric insulating sheet 1 to exert excellent heat resistance, the polyester fiber non-woven fabrics are used as the non-woven fabrics constituting the electric insulating sheet together with the resin film 3. The non-woven fabrics for allowing the electric insulating sheet to exert excellent heat resistance may be materials other than the polyester fiber non-woven fabrics.

In the case of selecting the non-woven fabrics from materials other than the polyester fiber non-woven fabrics, fibers constituting the non-woven fabrics preferably contain at least one resin selected from the group consisting of a polyacetal resin, an aliphatic polyamide resin, an aromatic polyamide resin, a polycarbonate resin, a modified polyphenylene ether resin, an ultrahigh-molecular weight polyethylene resin, a syndiotactic polystyrene resin, a polyarylate resin, a polysulfone resin, a polyether sulfone resin, a polyphenylene sulfide resin, a polyetheretherketone resin, a polyimide resin, a polyetherimide resin, a fluorine resin, and a liquid crystal polymer. Further, the non-woven fabrics may contain a plurality of types of fibers. Further, the non-woven fabrics may contain the aforementioned fibers containing the resins, and other fibers such as wool, cotton, and pulp.

In the electric insulating sheet 1 of this embodiment, the two pieces of polyester fiber non-woven fabrics 2 and the resin film 3 have a common shape, and these are laminated with their contour shapes being aligned. The resin film 3 is adhered to directly to the polyester fiber non-woven fabrics 2 without the intervention of a pressure-sensitive adhesive or the like. Both surfaces of the resin film 3 are thermally adhered respectively to the polyester fiber non-woven fabrics 2.

The applications of the electric insulating sheet 1 of this embodiment are not particularly limited, but examples of the applications include insulating sheets (such as a slot liner, a wedge, and an interphase insulating sheet) in high-load motors such as drive motors for electric cars, hybrid cars, or the like. The thickness of the electric insulating sheet 1 is preferably 15 μm or more and 600 μm or less, more preferably 25 μm or more and 250 μm or less, in view of properties such as space saving properties and insulating properties. Further, the electric insulating sheet 1 preferably has excellent insulating properties and preferably exhibits a dielectric breakdown voltage of AC 3 kV (effective value) or more in a dielectric breakdown test in an electrical insulating oil at room temperature (for example, 23° C.). Further, the resin film 3 preferably has a volume resistivity, as measured based on JIS C2139 "Solid electric insulating material-Method for measuring volume resistivity and surface resistivity" 2008, of $1 \times 10^{13}$ Ω·cm or more. The volume resistivity of the resin film 3 is generally $1 \times 10^{18}$ Ω·cm or less.

Further, in order to allow the electric insulating sheet 1 to exert the stiffness and strength required as an insulating sheet for motors, the thickness of each of the polyester fiber non-woven fabrics 2 is preferably 5 μm or more and 250 μm or less, more preferably 10 μm or more and 150 μm or less. Further, the mass of the polyester fiber non-woven fabric 2 per unit area (hereinafter, referred to also as "mass per unit area") is preferably 15 g/m$^2$ or more and 100 g/m$^2$ or less, more preferably 20 g/m$^2$ or more and 50 g/m$^2$ or less. Further, the gas permeability of the polyester fiber non-woven fabric 2 is preferably 2 to 50 cm$^3$/cm$^2$·sec. The gas permeability can be determined by the Frazier method of JIS L1913 "General non-woven fabric test method" 2010.

The two pieces of polyester fiber non-woven fabrics 2 in this embodiment may have common or different characteristic values (such as thickness, mass per unit area, and gas permeability). Further, the two pieces of polyester fiber non-woven fabrics 2 may have different resin types.

It is preferable that the polyester fiber non-woven fabrics 2 be mainly composed of 0.3 dtex to 10 dtex fibers. Examples of the resins constituting the fibers include a polyethylene terephthalate resin (PET), a polybutylene terephthalate resin (PBT), a polyethylene naphthalate resin (PEN), a polybutylene naphthalate resin (PBN), and a polytrimethylene terephthalate resin (PTT). The fibers constituting the polyester fiber non-woven fabrics 2 may be composite fibers of sheath-core type, side-by-side type, split type, or the like. The polyester fiber non-woven fabrics 2 may contain a small amount of fibers composed of a resin other than the aforementioned polyester resins. Examples of the resin other than the polyester resin include a polyamide resin, a polypropylene resin, a polyvinyl alcohol resin, and an acetyl cellulose resin. Further, the polyester fiber non-woven fabrics 2 may contain fibers of wool, cotton, pulp, or the like.

The polyester fiber non-woven fabrics 2 can be produced, for example, by forming a web with the aforementioned fibers and thereafter performing a post-treatment such as adhering or interlacing the fibers constituting the web to each other. Examples of the method for forming the web include the carding method, the air-laid method, the wet papermaking method, the spunbond method, and the meltblowing method. Examples of the post-treatment of the web include treatments by the thermal bond method, the chemical bond method, the needle punch method, the spunlace method, the stitch bond method, the steam jet method, or the like.

Each of the polyester fiber non-woven fabrics 2 does not necessarily have a single-layer structure and may have a laminated structure. The polyester fiber non-woven fabric 2 may have, for example, a three-layer structure including an interlayer between two surface layers. The polyester fiber non-woven fabric 2 having a three-layer structure may have a first surface layer that is suitable for thermal adhesion to the resin film 3 and a second surface layer that is suitable for an insulating sheet for motors. Mechanical properties suitable as an insulating sheet for motors can be given to the polyester fiber non-woven fabric 2 having a three-layer structure by the mechanical properties of the interlayer. That is, the polyester fiber non-woven fabric 2 of this embodiment preferably has a laminated structure including three layers or more, in the case where the electric insulating sheet 1 is used as an insulating sheet for motors or the like.

Considering the work to produce the electric insulating sheet 1, it is preferable that one side and the other side of the polyester fiber non-woven fabric 2 can be handled in the same way as each other. Accordingly, it is preferable that the first surface layer and the second surface layer of the polyester fiber non-woven fabric having a laminated structure with three layers or more in the thickness direction are in a common state. That is, the fiber material, the fiber thickness, and the porosity are preferably common in the first surface layer and the second surface layer.

In the case where the electric insulating sheet 1 is used as an insulating sheet for motors, it is preferable that the interlayer have a dense structure with thin fibers, as compared with the surface layers. On the other hand, in consideration of thermal adhesion to the resin film 3, the first surface layer is preferably roughened to some extent while being composed of fibers having a certain thickness or more. Further, for exerting appropriate slip properties with a core for motors or the like, the second surface layer is also preferably roughened to some extent while being composed of fibers having a certain thickness or more. That is, the two surface layers of the polyester fiber non-woven fabric 2 are preferably formed by thick fibers, as compared with the interlayer. Further, the interlayer of the polyester fiber non-woven fabric 2 preferably has low porosity (high fiber density), as compared with the two surface layers.

More specifically, the polyester fiber non-woven fabric preferably has the two surface layers formed by the general spunbond method and the interlayer formed by the meltblowing method. Further, the fibers of the interlayer of the polyester fiber non-woven fabric preferably have an average thickness (diameter) of 1 μm or more and 3 μm or less. The fibers of the two surface layers of the polyester fiber non-woven fabric preferably have an average thickness of 5 times or more and 7 times or less that of the interlayer. The fiber thickness of the surface layers and the interlayer can be determined, for example, by observing the surface layers and the interlayer with a scanning electron microscope (SEM), measuring the thickness of 10 or more fibers selected at random, and arithmetically averaging the measured values.

The fiber density of the surface layers of the polyester fiber non-woven fabric 2 is preferably 1/7 or more and 1/5 or less of that of the interlayer. The fiber density of the surface layers and the interlayer means the volume fraction of fibers in the surface layers and the interlayer. When the true specific gravity of the polyester fibers forming the surface layers and the interlayer is referred to as D1, and the apparent density of the surface layers and the interlayer is referred to as D2, the fiber density can be determined as a dimensionless value (D2/D1) obtained by dividing the apparent density by the true specific gravity. Further, the apparent density is obtained by dividing the mass per unit area of the surface layers and the interlayer by the thickness thereof. The mass per unit area of the interlayer is preferably 10 to 30 g/m². The thickness of the interlayer is preferably 5 to 40 μm.

The thickness of the resin film 3 constituting the electric insulating sheet 1 together with the polyester fiber non-woven fabrics 2 configured as above is preferably 1 μm or more and 200 μm or less, more preferably 10 μm or more and 50 μm or less. The resin film 3 has at least surfaces formed by a resin composition that contains a polyether sulfone resin as the main component of its resin components. The resin film 3 having at least surfaces containing a polyether sulfone resin as the main component exerts excellent thermal adhesiveness to the polyester fiber non-woven fabrics 2. That is, the resin film 3 is effective to allow the electric insulating sheet 1 to exert excellent heat resistance.

In the resin film 3 of this embodiment, not only the surfaces thereof but also the entire thereof is composed of the resin composition. The resin composition constituting the resin film 3 contains resin components as essential components and contains additives or the like as optional components. The resin composition of this embodiment contains a polyether sulfone resin as the main component of its resin components as described above. The state that the polyether sulfone resin is the main component of the resin components means that the mass ratio of the polyether sulfone resin in the whole resin components is higher than in other resins. That is, the state that the polyether sulfone resin is the main component of the resin components means that the polyether sulfone resin is contained at the highest mass ratio among a plurality of resins constituting the resin components. The main component of the resin components is not necessarily one type of polyether sulfone resin and may be two or more types of polyether sulfone resins. For example, two types of polyether sulfone resins having different average molecular weights may be contained as the main component.

The resin composition of this embodiment contains one or two or more types of resins other than the polyether sulfone resin as accessory components of the resin components. The resin composition of this embodiment contains at least a phenoxy resin as an accessory component. The resin composition of this embodiment contains two types of resins as accessory components. The first resin of the two types of resins in the resin composition is the phenoxy resin. The second resin of the two types of resins is a resin having higher melt viscosity at 300° C. than the phenoxy resin. When the melt viscosity at 300° C. of the accessory components is referred to as $\eta_0$ (Pa·s), and the melt viscosity at 300° C. of the main component (polyether sulfone resin) is referred to as $\eta_1$ (Pa·s), the resin composition of this embodiment satisfies Relational expression (1) below:

$$\eta_0 \geq (\eta_1 \cdot 100) \tag{1}$$

Since the accessory component containing the phenoxy resin exhibits a melt viscosity equal to or higher than the polyether sulfone resin, the resin composition exerts an appropriate viscosity when heated and melted. The resin composition exerts excellent thermal adhesiveness to fiber materials by having an appropriate viscosity. Moreover, whatever the fiber materials are made of, the resin composition of this embodiment exhibits good thermal adhesiveness to such fiber materials by having the phenoxy resin.

Here, in the case where two or more types of polyether sulfone resins are contained in the resin composition, "$\eta_1$" is determined, in principle, with respect to a mixed resin obtained by mixing a plurality of polyether sulfone resins at the ratio at which they are contained in the resin composition. The same applies to the case where the accessory components contain two or more types of resins.

The melt viscosity at 300° C. of the polyether sulfone resin as the main component is preferably 110 Pa·s or more, more preferably 120 Pa·s or more. The melt viscosity at 300° C. of the polyether sulfone resin is preferably 180 Pa·s or less, more preferably 170 Pa·s or less. The melt viscosity of the mixed resin serving as the accessory components of the resin components and containing the first resin and the second resin is preferably a value between a value lower than the melt viscosity of the polyether sulfone resin by 100 Pa·s and a value higher than the melt viscosity of the polyether sulfone resin by 100 Pa·s. That is, in the resin composition, it is preferable that the melt viscosity at 300° C. of the main component of the resin components ($\eta_1$) and the melt viscosity at 300° C. of the accessory components ($\eta_0$) satisfy Relational expression (2) below:

$$(\eta_1 + 100) \geq \eta_0 \geq (\eta_1 \cdot 100) \tag{2}$$

The melt viscosity of the polyether sulfone resin and the melt viscosity of the mixed resin can be measured by the methods described in Examples.

The resin composition in this embodiment contains a polyamide resin as the second resin. The melting point of the polyamide resin is equal to or more than the glass transition temperature of the polyether sulfone resin. The resin composition exerts excellent thermal adhesiveness to polyester fiber materials such as polyester fiber non-woven fabrics by containing the phenoxy resin. The resin composition exerts excellent heat resistance by containing the polyamide resin having a melting point equal to or higher than the glass transition temperature of the polyether sulfone resin. Specifically, even when the electric insulating sheet 1 of this embodiment is heated to the glass transition temperature of the polyether sulfone resin or higher, the resin film 3 is not extremely softened since the resin film 3 contains the polyamide resin having high melting point. Accordingly, even when the electric insulating sheet 1 of this embodiment is placed under high-temperature conditions, the two pieces of polyester fiber non-woven fabrics 2 are less likely to separate from the resin film 3.

The glass transition temperature of the polyether sulfone resin can be determined by measuring the midpoint glass transition temperature (Tg) using a heat flux-type differential scanning calorimeter (DSC). The midpoint glass transition temperature (Tg) can be determined based on the method described in JIS K7121 "Testing methods for transition temperatures of plastics" 1987. Further, the melting point of the polyamide resin can be determined by measuring the melt peak (Tm) also using a DSC. The melt peak (Tm) can be determined based on the method described in the aforementioned JIS standard. More specifically, the glass transition temperature and the melt peak temperature can be determined from a DSC curve measured under a stream of nitrogen gas at a rate of temperature increase of 5° C./min.

The glass transition temperature of the polyether sulfone resin is generally 225° C., and the polyamide resin preferably has a melting point of 240° C. or more. The melting point of the polyamide resin is more preferably 260° C. or more, particularly preferably 280° C. or more. However, when the polyamide resin has excessively high melting point, an operation at a very high temperature is required when preparing the resin composition. Accordingly, the melting point of the polyamide resin is preferably 350° C. or less, more preferably 340° C. or less, particularly preferably 330° C. or less.

As the polyamide resin, a polyamide resin polymerized by dehydration condensation of diamine with dicarboxylic acid, or a polyamide resin obtained by polymerizing the diamine with aminocarboxylic acid instead of a part or the entire of the dicarboxylic acid can be employed.

Examples of the diamine constituting the polyamide resin include a linear aliphatic diamine having 2 to 20 carbon atoms such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine; a branched aliphatic diamine in which a hydrogen atom bonded to the main chain (carbon) of the linear aliphatic diamine is substituted with an alkyl group having 1 to 3 carbon atoms, such as 2-methyl pentamethylenediamine, and 3-ethyl hexamethylenediamine; an alicyclic diamine such as 1,4-cyclohexanediamine, 1,3-cyclohexanediamine, and 1,3-cyclopentanediamine; and an aromatic diamine such as xylylenediamine.

Examples of the dicarboxylic acid constituting the polyamide resin include a linear or branched saturated aliphatic dicarboxylic acid having 3 to 20 carbon atoms such as malonic acid, dimethyl malonate, succinic acid, 2,2-dimethyl succinate, 2,2-diethyl succinate, glutaric acid, 2,2-dimethyl glutarate, 2,3-dimethyl glutarate, 2,3-diethyl glutarate, adipic acid, 2-methyl adipate, trimethyl adipate, pimelic acid, suberic acid, azelaic acid, sebacic acid, dodecanedioic acid, tetradecanedioic acid, hexadecanedioic acid, octadecanedioic acid, eicosanedioic acid, and diglycolic acid; an alicyclic dicarboxylic acid such as 1,4-cyclohexanedicarboxylic acid, 1,3-cyclohexanedicarboxylic acid, and 1,3-cyclopentanedicarboxylic acid; and an aromatic dicarboxylic acid having 8 to 20 carbon atoms such as terephthalic acid, isophthalic acid, naphthalenedicarboxylic acid, 2-chloroterephthalic acid, 2-methyl terephthalate, 5-methyl isophthalate, and 5-sodium sulfoisophthalate.

Examples of the aminocarboxylic acid constituting the polyamide resin include 6-aminocaproic acid, 11-aminoundecanoic acid, 12-aminododecanoic acid, and p-aminomethylbenzoic acid.

The polyamide resin does not necessarily contain one type of diamine, dicarboxylic acid, and aminocarboxylic acid individually as its constituent units, and may be formed, for example, by polymerizing two or more types of diamines with one type of dicarboxylic acid or polymerizing one type of diamine with two or more types of dicarboxylic acids.

For achieving high melting point, any one of the diamine, the dicarboxylic acid, and the aminocarboxylic acid employed in the polyamide resin is preferably aromatic. Among these, the polyamide resin is preferably an aromatic polyamide resin (polyamide 6T) containing hexamethylenediamine and terephthalic acid as its constituent units. The polyamide 6T (PA6T) may be a modified product containing 2-methyl pentamethylenediamine instead of part of hexamethylenediamine. As the polyamide resin of this embodiment, the polyamide 6T that is a modified product containing hexamethylenediamine and 2-methyl pentamethylenediamine at a molar ratio of 1:2 to 2:1 is particularly suitable.

Examples of the phenoxy resin contained in the resin composition together with the polyamide resin include a phenoxy resin having at least one skeleton selected from bisphenol A skeleton, bisphenol F skeleton, bisphenol S skeleton, bisphenol acetophenone skeleton, novolak skeleton, biphenyl skeleton, fluorene skeleton, dicyclopentadiene skeleton, norbornene skeleton, naphthalene skeleton, anthracene skeleton, adamantane skeleton, terpene skeleton, and trimethylcyclohexane skeleton. Among these, a phenoxy resin having bisphenol A skeleton and having an epoxy group at either end or both ends is preferable as the phenoxy resin.

The phenoxy resin preferably has a mass-average molecular weight (Mw), as measured by gel permeation chromatography (GPC) under the following conditions and expressed as a value in terms of polystyrene, of 10000 to 100000.

(GPC conditions)
Standard reagent: TSK standard polystyrene (A-500, A-2500, F-1, F-4, F-20, and F-128, manufactured by Tosoh Corporation)
Solvent: THF
Column: GF-1G7B+GF-7MHQ (manufactured by Showa Denko K. K.)

Further, the phenoxy resin preferably has an epoxy equivalent, as determined according to JIS K 7236, of 5000 to 50000 g/eq.

In the resin composition, the ratio of the polyether sulfone resin with respect to all resins (whole resin components) contained therein is preferably 40 to 90 mass %, more preferably 50 to 85 mass %. Further, in the resin composition, the total amount of the polyamide resin and the phenoxy resin is preferably 30 to 80 parts by mass with respect to 100 parts by mass of the polyether sulfone resin. The polyamide resin is preferably contained in the resin composition at a mass ratio equal to or more than that of the phenoxy resin. Specifically, when the total amount of the polyamide resin and the phenoxy resin is taken as 100 mass %, the ratio of the phenoxy resin is preferably 30 to 50 mass %, more preferably 35 to 45 mass %.

The resin composition forming the resin film 3 may contain resins other than the polyether sulfone resin, the polyamide resin, and the phenoxy resin. The content of the resins other than the polyether sulfone resin, the polyamide resin, and the phenoxy resin in the resin composition is preferably 5 mass % or less, more preferably 1 mass % or less. It is particularly preferable that the resin composition be substantially free from the resins other than the polyether sulfone resin, the polyamide resin, and the phenoxy resin.

The resin film 3 can be obtained by full compounding of these resins using a common kneading means, forming resin pellets made of the resin composition, and thereafter forming the resin pellets into a film shape. Examples of the kneading means include a kneader, a pressure kneader, an open roll, a Banbury mixer, and a twin screw extruder. Further, the resin film 3 can be produced, for example, by dry-blending these resins, feeding them to an extruder equipped with a T-die or the like, and extruding the resin composition prepared in the extruder from the T-die in a molten state.

Figure 2:
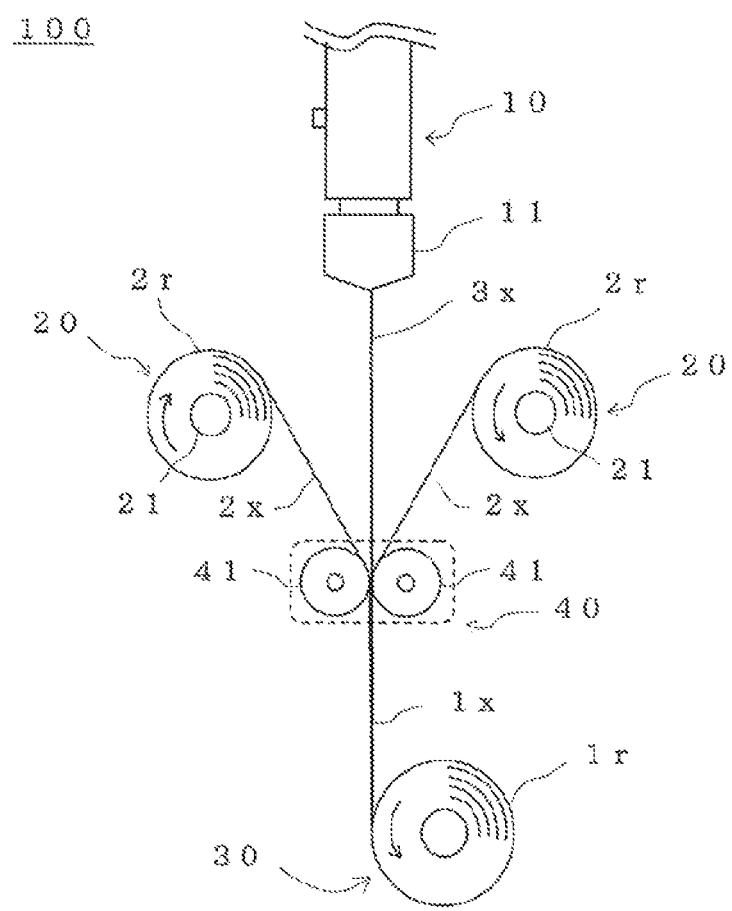
FIG. 2 is a schematic view showing a method for producing the electric insulating sheet.

In order to form an electric insulating sheet using such a resin composition and the polyester fiber non-woven fabrics, a method using a device as shown in FIG. 2, for example, can be employed. In this embodiment, an elongated strip-shaped electric insulating sheet 1x can be obtained using the device as shown in FIG. 2.

A description for the device shown in FIG. 2 is given as follows: the device 100 includes: an extruder 10 equipped with a T-die 11; two units of feeding machines 20 configured to deliver elongated strip-shaped polyester fiber non-woven fabrics 2x from sheet rolls 2r on which the polyester fiber non-woven fabrics 2x are wound into rolls; a winding machine 30 configured to wind the elongated strip-shaped electric insulating sheet 1x produced as a rolled product 1r; and a laminating machine 40 configured to laminate the two pieces of polyester fiber non-woven fabrics 2x unwound by the feeding machines 20 with the resin composition. The feeding machines 20 have rotating shafts 21 to mount the sheet rolls 2r thereon and are configured to be capable of unwinding the polyester fiber non-woven fabrics 2x from the sheet rolls 2r at a constant speed by rotating the rotating shafts 21 about the axes at a certain speed. The laminating machine 40 has a pair of narrowing rollers 41 configured to sandwich the two pieces of polyester fiber non-woven fabrics 2x unwound by the feeding machines 20 in two layers and is configured so that the distance between the narrowing rollers 41 is adjustable. The extruder 10 includes the T-die 11 in order to form the resin film 3x using the resin composition in a molten state by melt-kneading the resin composition, and is configured to be capable of extruding the resin film 3x from the T-die 11 to the space between the two pieces of polyester fiber non-woven fabrics 2x before passing through the narrowing rollers 41.

Further, the device 100 is configured so that the polyester fiber non-woven fabrics 2x are thermally adhered to the resin film 3x when the resin film 3x in the molten state is sandwiched by the two pieces of polyester fiber non-woven fabrics 2x. Further, the device 100 is configured so that the thickness of the resin film in the electric insulating sheet 1x to be produced can be rectified by the narrowing rollers 41. Specifically, the slit thickness of the T-die 11 and the discharge rate of the extruder 10 are set in the device 100, in order to form the resin film 3x in the molten state once with a larger thickness than that of the resin film in the electric insulating sheet 1x. In this embodiment, an appropriate pressure can be generated by this configuration when the resin film is thermally adhered to the polyester fiber non-woven fabrics, so that the device 100 can allow good adhesion state of the resin film to the polyester fiber non-woven fabrics.

The electric insulating sheet 1x of this embodiment can be produced by unwinding the polyester fiber non-woven fabrics 2x from the two sheet rolls 2r, stacking the unwound polyester fiber non-woven fabrics 2x in two layers, and extruding the resin composition in a thermally molten state to the space between these layers into a film shape. In this embodiment, the main component (base resin) of the resin film 3x is a polyether sulfone resin, and the polyamide resin having a melting point higher than the softening point of the polyether sulfone resin is contained in the resin film 3x. Therefore, the resin composition can exert appropriate melt tension when forming the resin film 3x so as to be discharged stably from the T-die 11. Further, in this embodiment, a phenoxy resin is contained in the resin composition that is discharged from the T-die 11 into a film shape. Therefore, the resin film 3x formed by the resin composition exerts excellent thermal adhesiveness between the polyester fiber non-woven fabrics 2x.

In this embodiment, since the discharge of the resin composition from the T-die 11 can be made stable, locally reduced thickness of the resin film 3x and entrapment of air bubbles in the resin film 3x during lamination to the polyester fiber non-woven fabrics 2x can be suppressed. Accordingly, the electric insulating sheet can have excellent insulation reliability with high dielectric breakdown voltage and high partial discharge inception voltage.

In this embodiment, the use of the electric insulating sheet of the present invention as an insulating sheet for motors is shown as an example, in order to exert the effects of the present invention more significantly, but the applications of the electric insulating sheet of the present invention are not limited to the insulating sheet for motors. Further, in this embodiment, the polyester fiber non-woven fabrics are shown as mating members that are thermally adhered to the resin composition, but the polyester fiber materials that are thermally adhered to the resin composition of the present invention are not limited to the non-woven fabrics and may be woven fabrics or knittings. Further, the mating members that are thermally adhered to the resin composition of the present invention are not limited to surface materials such as fabrics and may be wire materials such as threads. Further, in the present invention, conventionally known technical matters can be appropriately employed other than the matters shown above as examples.

EXAMPLES

Next, the present invention will be described further in detail by way of examples. However, the present invention is not limited to these examples.

Production of Electric Insulating Sheet

An electric insulating sheet was produced using the following materials.

Polyester Non-Woven Fabrics:

Non-woven fabrics by the spunbond method, manufactured by TOYOBO CO., LTD., with a thickness of 40 μm and a mass per unit area of 30 g/m$^2$

PES:

Polyether sulfone resin (melt viscosity at 300° C.: 140 Pa·s, and Tg: 210° C.), available under the product name ULTRASON® manufactured by BASF SE

PHX:

Phenoxy resin (melt viscosity at 300° C.: 11 Pa·s), available under the product name PHENOTOHTO® manufactured by Tohto Kasei Co., Ltd. (NIPPSON STEEL Chemical & Material Co., Ltd. since 2010).

PA1:

Polyamide resin (PA6T, melt viscosity at 300° C.: 16 Pa·s, and Tm: 300° C.), available under the product name ZYTEL® manufactured by DuPont

PA2:

Polyamide resin (PA6T, melt viscosity at 300° C.: 20 Pa·s, and Tm: 300° C.), available under the product name ARLEN® manufactured by Mitsui Chemicals, Inc.

PA3:

Polyamide resin (amorphous polyamide, melt viscosity at 300° C.: 57 Pa·s, Tm: none, and softening point: about 160° C.), available under the product name TROGAMID® believed to be manufactured by BASF SE and sold by EVONIK,

PA4:

Polyamide resin (PAST, melt viscosity at 300° C.: 65 Pa·s, and Tm: 300° C.), available under the product name GENESTAR® manufactured by KURARAY CO., LTD.

PC:

Polycarbonate resin, available under the product name PANLITE® manufactured by TEIJIN LIMITED

PET:

Polyethylene terephthalate resin, available under the product name ALTESTER® manufactured by MITSUBISHI GAS CHEMICAL COMPANY, INC.

Examples 1 to 4 and Comparative Examples 1 to 7

Each resin composition containing resins at a mass ratio shown in Table 1 below was heated for melt-kneading, the resultant melt-kneaded product was extruded from the T-die to produce a film, and the film in a thermally molten state was sandwiched by two pieces of polyester non-woven fabrics so that the resin film was thermally adhered to the polyester non-woven fabrics, to produce an electric insulating sheet having a three-layer structure. The thickness of the resin film in the electric insulating sheet was 50 μm. However, in Comparative Example 6, an electric insulating sheet was produced by laminating only three pieces of polyester non-woven fabrics without providing the resin film. Further, in Comparative Example 7, a PET film alone (thickness: 125 μm) was used instead of the electric insulating sheet.

Table 1 shows the melt viscosity at 300° C. ($\eta_0$: Pa·s) of mixed resins obtained by mixing resins other than the polyether sulfone resin (accessory components) at a mass ratio shown in Table 1 (for example, a mixed resin obtained by mixing a phenoxy resin and a polyamide resin at a mass ratio of 1:1 was used in Example 1) and the melt viscosity at 300° C. ($\eta_1$: Pa·s) of the polyether sulfone resin together. Further, Table 1 shows whether "$\eta_0$" and "$\eta_1$" satisfy (○) or do not satisfy (×) Relational expression (1) below:

$$\eta_0 \geq (\eta_1 \cdot 100) \qquad (1).$$

The method for measuring the melt viscosity of the mixed resins and the polyether sulfone resin was as described below.

Method for Measuring Melt Viscosity

The melt viscosity of the mixed resins and the polyether sulfone resin was measured using a microcompounder, available under the product name AAKE™ MiniLab II manufactured by Thermo Fisher Scientific K.K., under conditions of 300° C.×100 min$^{-1}$×1 min.

TABLE 1

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| PES (Main component) |  | 60 | 60 | 60 | 60 | 60 | 60 | 60 | — | — |
| Accessory components | PHX | 20 | 16 | 24 | 16 | — | 40 | — | — | 40 |
|  | PA1 | 20 | 24 | — | — | — | — | — | — | 60 |
|  | PA2 | — | — | 16 | — | — | — | — | — | — |
|  | PA3 | — | — | — | 24 | — | — | — | — | — |
|  | PA4 | — | — | — | — | 40 | — | — | — | — |
|  | PC | — | — | — | — | — | — | — | 60 | — |
|  | PET | — | — | — | — | — | — | 40 | 40 | — |
| $\eta_0$ |  | 60 | 48 | 198 | 134 | 65 | 11 | 16 | — | — |
| $\eta_1$ |  | 140 | ← | ← | ← | ← | ← | ← | ← | ← |
| Relational expression (1) |  | ○ | ○ | ○ | ○ | ○ | X | X | — | — |

Evaluation 1: Thermal Adhesiveness

The electric insulating sheet after the production was subjected to sensory evaluation of the adhesiveness between the polyester non-woven fabrics and the resin film. As a result, good adhesiveness between the polyester non-woven fabrics and the resin film was confirmed in Examples 1 to 4 and Comparative Examples 2 to 5. Meanwhile, the adhesiveness in the electric insulating sheet of Comparative Example 1 was poor as compared with that in the electric insulating sheet of Examples 1 to 4 and Comparative Examples 2 to 5.

Evaluation 2: Heat Resistance 1

Figure 3:
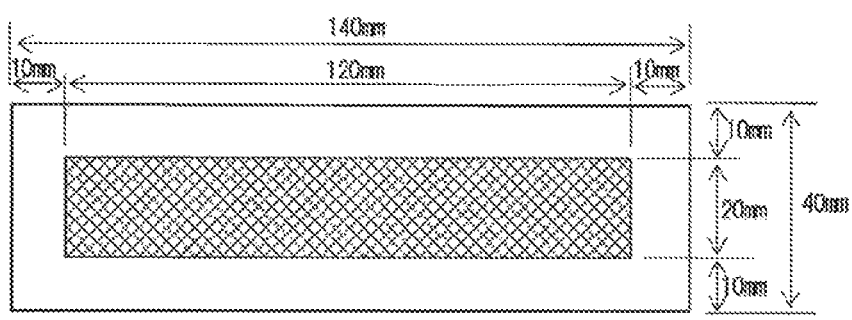
FIG. 3 is a three-sided view showing a test method for evaluating the thermal shrinkage.
Figure 3:
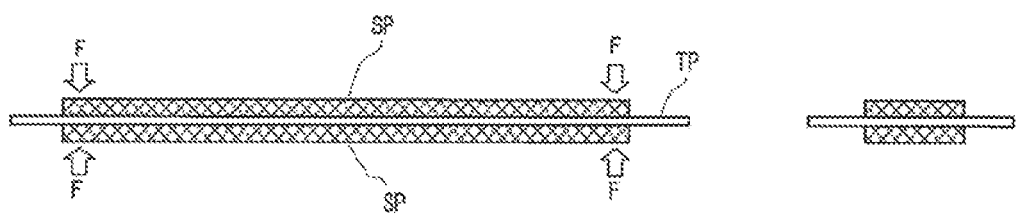

The obtained electric insulating sheet was subjected to evaluation of the insulation reliability at high temperature (heat resistance test) by the method as shown in FIG. 3. That is, a test piece TP with a length of 140 mm×a width of 40 mm was cut out from the electric insulating sheet, and it was sandwiched between two pieces of iron plates SP with a length of 120 mm×a width of 20 mm. At this time, the two pieces of iron plates SP were arranged to overlap each other with their edges aligned, and the test piece TP was arranged so as to extend outwardly from the periphery of the iron plates SP by 10 mm. Then, the test piece TP was held with a clamping force of 1 kgf at each of both ends (2 kgf in total) of the iron plates SP in the longitudinal direction, and they were housed in an oven with a temperature set to 250° C. Then, they were periodically taken out to be subjected to a pressure resistance test (with a cutoff current of 10 mA), and the heat resistance of the electric insulating sheet was evaluated by the heating time until the pressure resistance test is failed. The pressure resistance test was performed in air, by applying an AC voltage between the iron plates at a rate of voltage increase of 1000 V/s to the maximum of 1 kV.

Evaluation 3: Heat Resistance 2

The obtained electric insulating sheet was heated at a temperature of 230° C. for 30 minutes, and the thermal shrinkage ratios in the extrusion direction (MD) of the resin film by the T-die and in a direction orthogonal to the extrusion direction (TD) were determined by the following calculation method:

Thermal shrinkage ratio (%)=$[(L_0-L_1)/L_0]\times 100$.

Here, $L_0$ represents the dimension of the electric insulating sheet before the heating, and $L_1$ represents the dimension of the electric insulating sheet after the heating.

Evaluation 4: Heat Resistance 3

A test piece for a tensile test was produced using the resin film alone, and the initial tensile fracture stress $S_0$ (MPa) was measured. Further, the test piece was thermally aged for 1250 hours in a Geer oven set to a temperature of 200° C. The tensile fracture stress $S_1$ (MPa) of the thermally aged test piece was determined, and the residual factor was determined by the following calculation method:

Residual factor (%)=$(S_1/S_0)\times 100$.

Evaluation 5: Solvent Resistance

The sheet sample of the resin film alone was immersed in styrene monomer, followed by heating at a temperature of 130° C. for 10 minutes. The sheet sample after the heating was subjected to a pressure resistance test in the same manner as in "Evaluation 2: Heat resistance 1". The results of the aforementioned evaluations are shown in Table 2 below.

TABLE 2

| | | Example 1 | Example 2 | Example 3 | Example 4 | Comparative Example 1 | Comparative Example 2 |
|---|---|---|---|---|---|---|---|
| 1) Thermal adhesiveness | | Good | Good | Good | Good | Poor | Good |
| 2) Heat resistance 1 (Pressure test) | | ≥370 h | ≥370 h | ≥370 h | ≥370 h | 100 h | 170 h |
| 3) Heat resistance 2 (Thermal shrinkage) | MD | 1.0% | 0.8% | 1.2% | 1.6% | 1.2% | 0.8% |
| | TD | 0.8% | 1.1% | 0.4% | 0.4% | 0.3% | −0.5% |
| 4) Heat resistance 3 (Residual factor) | | 50% | 60% | 45% | 60% | 35% | 56% |
| 5) Solvent resistance | | Passed | Passed | Passed | Passed | Passed | Passed |

| | | Comparative Example 3 | Comparative Example 4 | Comparative Example 5 | Comparative Example 6 | Comparative Example 7 |
|---|---|---|---|---|---|---|
| 1) Thermal adhesiveness | | Good | Good | Good | — | — |
| 2) Heat resistance 1 (Pressure test) | | 370 h | 70 h | 100 h | 16 h | 16 h |
| 3) Heat resistance 2 (Thermal shrinkage) | MD | 1.2% | 1.5% | 1.3% | 2.3% | 4.7% |
| | TD | 0.3% | −0.3% | 1.2% | 0.9% | 1.1% |
| 4) Heat resistance 3 (Residual factor) | | 32% | 0 | 11% | 27% | 33% |
| 5) Solvent resistance | | Passed | Failed | Passed | — | — |

*1 The value of "≥370 h" means that the object passed the pressure test even after a lapse of 370 hours.

*2 The "minus" values of the thermal shrinkage indicate that part of the electric insulating sheet was thermally melted, and the apparent dimension increased.

It can be seen also from the results shown above that the present invention provides a resin composition having excellent thermal adhesiveness and excellent heat resistance and provides an electric insulating sheet having excellent heat resistance.

REFERENCE SIGNS LIST

1: Electric insulating sheet
2: Polyester fiber non-woven fabric
3: Resin film (resin composition)

The invention claimed is:

1. An electric insulating sheet comprising:
   a polyester fiber non-woven fabric; and
   a resin film laminated onto the polyester fiber non-woven fabric, wherein
   the polyester fiber non-woven fabric and the resin film are thermally adhered to each other by adhering the polyester fiber non-woven fabric and the resin film to each other when the resin film is in a molten state,
   the resin film has at least a surface that is thermally adhered to the polyester fiber non-woven fabric and is formed by a resin composition containing a polyether sulfone resin,
   the resin composition contains:
   the polyether sulfone resin having a melt viscosity at 300° C. of 110 Pa·s or more and 180 Pa·s or less,
   a polyamide resin having a melt viscosity at 300° C. of 16 Pa·s or more and 65 Pa·s or less,
   a phenoxy resin having bisphenol A skeleton and an epoxy group at either end or both ends, and having a mass-average molecular weight (Mw) of 10000 to 100000,
   a total amount of the polyamide resin and the phenoxy resin is 30 to 80 parts by mass with respect to 100 parts by mass of the polyether sulfone resin,
   an amount of the polyether sulfone resin is 50 mass % or more with respect to a total amount of the resin composition,
   when a total amount of the polyamide resin and the phenoxy resin is taken as 100 mass %, a ratio of a content of the phenoxy resin relative to the total amount of the polyamide resin and the phenoxy resin is 30 to 50 mass %,
   and
   when the resins other than the polyether sulfone resin in a mixed state have a melt viscosity at 300° C. of $\eta_0$ (Pa·s), and the polyether sulfone resin has a melt viscosity at 300° C. of $\eta_1$ (Pa·s), the resin composition satisfies Relational expression below:

$$(\eta_1+100) \geq \eta_0 \geq (\eta_1-100).$$

2. The electric insulating sheet according to claim 1, wherein
   the polyamide resin has a melting point equal to or higher than a glass transition temperature of the polyether sulfone resin.

3. The electric insulating sheet according to claim 1, comprising:
   at least a three-layer structure formed by laminating two pieces of polyester fiber non-woven fabrics onto both sides of the resin film, and
   at least both surfaces of the resin film are formed by the resin composition.

4. The electric insulating sheet according to claim 1, wherein
   the entire resin film is formed by the resin composition.

5. An insulating sheet for motors, comprising the electric insulating sheet according to claim 1.

6. The electric insulating sheet according to claim 1, wherein the polyester fiber non-woven fabric has a gas permeability of 2 to 50 $cm^3/cm^2$·sec.

7. The electric insulating sheet according to claim 1, wherein the polyester fiber non-woven fabric is produced by a spunbond method.

8. The electric insulating sheet according to claim 1, wherein the polyester fiber non-woven fabric comprises an interlayer between two surface layers, and a fiber density of the interlayer is higher than a fiber density of the two surface layers.

* * * * *